(12) United States Patent
Seo et al.

(10) Patent No.: US 12,469,918 B2
(45) Date of Patent: Nov. 11, 2025

(54) BATTERY PACK AND VEHICLE COMPRISING SAME

(71) Applicant: LG ENERGY SOLUTION, LTD., Seoul (KR)

(72) Inventors: Sung-Won Seo, Daejeon (KR); Dal-Mo Kang, Daejeon (KR); Jeong-O Mun, Daejeon (KR); Hyeon-Ki Yun, Daejeon (KR); Eun-Ah Ju, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 729 days.

(21) Appl. No.: 17/770,480

(22) PCT Filed: Jul. 20, 2021

(86) PCT No.: PCT/KR2021/009360
§ 371 (c)(1),
(2) Date: Apr. 20, 2022

(87) PCT Pub. No.: WO2022/019624
PCT Pub. Date: Jan. 27, 2022

(65) Prior Publication Data
US 2022/0393290 A1 Dec. 8, 2022

(30) Foreign Application Priority Data

Jul. 22, 2020 (KR) .................. 10-2020-0091079

(51) Int. Cl.
*H01M 50/249* (2021.01)
*H01M 50/207* (2021.01)

(52) U.S. Cl.
CPC ....... *H01M 50/249* (2021.01); *H01M 50/207* (2021.01); *H01M 2220/20* (2013.01)

(58) Field of Classification Search
CPC ............. H01M 50/249; H01M 50/207; H01M 2220/20; H01M 50/209; H01M 50/244;
(Continued)

(56) References Cited

U.S. PATENT DOCUMENTS

| 2012/0205971 A1 | 8/2012 | Choo et al. |
| 2014/0127552 A1 | 5/2014 | Lu et al. |

(Continued)

FOREIGN PATENT DOCUMENTS

| CN | 102576835 A | 7/2012 |
| CN | 206558575 U | 10/2017 |

(Continued)

OTHER PUBLICATIONS

International Search Report for PCT/KR2021/009360 mailed on Oct. 26, 2021.
(Continued)

*Primary Examiner* — Lisa S Park
(74) *Attorney, Agent, or Firm* — Birch, Stewart, Kolasch & Birch, LLP

(57) ABSTRACT

Discussed is a battery pack provided in a vehicle, the battery pack including a pack tray mounted on the vehicle; and at least one battery module provided on the pack tray, wherein the at least one battery module includes: at least one battery cell assembly mounted on the pack tray, and including at least one battery cell; and a plurality of side plates provided on opposite side surfaces of the at least one battery cell assembly to support the at least one battery cell assembly, the plurality of side plates being fixed to the pack tray, and wherein each of the plurality of side plates includes: a support portion supporting the at least one battery cell assembly; and a fixed portion extending from the support portion, and fixed to the pack tray.

13 Claims, 9 Drawing Sheets

(58) Field of Classification Search
CPC ............ H01M 50/258; H01M 50/262; H01M 50/211; H01M 50/289; H01M 50/20; H01M 10/613; B60K 2001/0438; B60K 1/04; Y02E 60/10; B60L 50/64; B60L 58/26; Y02T 10/70
See application file for complete search history.

(56) References Cited

U.S. PATENT DOCUMENTS

| | | | |
|---|---|---|---|
| 2015/0024252 A1* | 1/2015 | Seong | H01M 50/105 |
| | | | 429/153 |
| 2015/0270525 A1 | 9/2015 | Jeong et al. | |
| 2015/0349394 A1 | 12/2015 | Hayashida et al. | |
| 2016/0365551 A1* | 12/2016 | Maguire | H01M 10/647 |
| 2018/0034117 A1 | 2/2018 | Bang et al. | |
| 2018/0337374 A1* | 11/2018 | Matecki | B60K 1/04 |
| 2020/0203788 A1 | 6/2020 | Kang | |
| 2021/0288371 A1* | 9/2021 | Harazuka | H01M 50/262 |
| 2021/0328301 A1 | 10/2021 | Chen et al. | |

FOREIGN PATENT DOCUMENTS

| | | |
|---|---|---|
| CN | 110720158 A | 1/2020 |
| CN | 211017198 U | 7/2020 |
| EP | 2 490 276 A2 | 8/2012 |
| EP | 2 768 045 A1 | 8/2014 |
| JP | 2008-53019 A | 3/2008 |
| JP | 2008-282625 A | 11/2008 |
| JP | 4513451 B2 | 7/2010 |
| JP | 2011-187275 A | 9/2011 |
| JP | 2012-123917 A | 6/2012 |
| JP | 5096038 B2 | 12/2012 |
| JP | 5672461 B2 | 2/2015 |
| JP | 2015-106531 A | 6/2015 |
| JP | 2015-225703 A | 12/2015 |
| JP | 2015-225765 A | 12/2015 |
| JP | 2016-29624 A | 3/2016 |
| JP | 2017-191755 A | 10/2017 |
| JP | 2018-41653 A | 3/2018 |
| KR | 10-1601568 B1 | 3/2016 |
| KR | 10-2016-0101382 A | 8/2016 |
| WO | WO2020/026966 * | 2/2020 |
| WO | WO 2020/026966 A1 | 2/2020 |

OTHER PUBLICATIONS

Extended European Search Report for European Application No. 21845908.9, dated Aug. 21, 2023.

* cited by examiner

BATTERY PACK AND VEHICLE COMPRISING SAME

TECHNICAL FIELD

The present disclosure relates to a battery pack and a vehicle including the same.

The present application claims priority to Korean Patent Application No. 10-2020-0091079 filed on Jul. 22, 2020 in the Republic of Korea, the disclosures of which are incorporated herein by reference.

BACKGROUND ART

Secondary batteries have high applicability according to product groups and electrical characteristics such as high energy density, and thus are commonly applied not only to mobile devices but also to electric vehicles (EVs) or hybrid vehicles (HEVs) driven by electric power sources. Because secondary batteries may radically reduce the use of fossil fuel and do not generate any by-products that come with energy consumption, the secondary batteries are gaining attention as a new alternative energy source for improving eco-friendliness and energy efficiency.

Types of secondary batteries that are currently wisely used include lithium-ion batteries, lithium polymer batteries, nickel cadmium batteries, nickel hydride batteries, and nickel zinc batteries. An operating voltage of a unit secondary battery cell, that is, a unit battery cell, ranges from about 2.5 V to about 4.5 V. Accordingly, when a higher output voltage is required, a plurality of battery cells may be connected in series to form a battery pack. Also, according to a charge/discharge capacity required for a battery pack, a plurality of battery cells may be connected in parallel to form a battery pack. Accordingly, the number of battery cells included in a battery pack may be set in various ways according to a required output voltage or charge/discharge capacity.

When a battery pack is constructed by connecting a plurality of battery cells in series or in parallel, in general cases, at least one battery module including at least one battery cell is first constructed, and other elements are added by using the at least one battery module.

A conventional battery pack generally includes at least one battery cell assembly including battery cells and a housing structure formed of a metal and having a box shape in which the at least one battery cell assembly is accommodated. In the case of the conventional battery pack, the housing structure in which the battery cell assembly is accommodated is mounted on a pack tray of a vehicle.

However, this structure of the conventional battery pack has problems in that energy density of the battery pack is reduced due to the weight or volume of the separate housing structure itself, and the total weight of the battery packet is increased.

Hence, there is a need to provide a battery pack capable of further increasing energy density and reducing the total weight through weight reduction and a vehicle including the battery pack.

DISCLOSURE

Technical Problem

The present disclosure is designed to solve the problems of the related art, and therefore the present disclosure is directed to providing a battery pack capable of increasing energy density and a vehicle including the battery pack.

The present disclosure is also directed to providing a battery pack capable of reducing the total weight through weight reduction and a vehicle including the battery pack.

The present disclosure is also directed to providing a battery pack capable of more efficiently controlling cell swelling and a vehicle including the battery pack.

Technical Solution

In one aspect of the present disclosure, a battery pack provided in a vehicle includes: a pack tray mounted on the vehicle; and at least one battery module provided on the pack tray, wherein the at least one battery module includes: at least one battery cell assembly mounted on the pack tray, and including at least one battery cell; and a plurality of side plates provided on both side surfaces of the at least one battery cell assembly to support the at least one battery cell assembly, the plurality of side plates being fixed to the pack tray, wherein each of the plurality of side plates includes: a support portion supporting the at least one battery cell assembly; and a fixed portion extending from the support portion, and fixed to the pack tray.

The support portion may cover a side surface of the at least one battery cell assembly, and be located perpendicular to the pack tray, and the fixed portion may protrude by a certain length from the support portion to be perpendicular to the support portion.

A mounting beam having a certain length may be provided on a top surface of the pack tray, wherein the fixed portion may be fixed to the mounting beam.

The fixed portion may be formed so that a height of the fixed portion is greater than a height of the mounting beam, in a height direction of the pack tray.

The at least one battery module may further include at least one fastening member for fixing the fixed portion to the mounting beam, wherein the at least one fastening member passes through the fixed portion to be fastened to the mounting beam.

The at least one battery module may further include at least one connection member connected to the plurality of side plates provided on both sides of the at least one battery cell assembly, and located over the at least one battery cell assembly.

The at least one connection member may include at least one long bolt member fastened to the plurality of side plates provided on both sides of the at least one battery cell assembly.

The at least one connection member may include at least one band member integrally covering the plurality of side plates provided on both sides of the at least one battery cell assembly.

The at least one band member may include: a band body located over the at least one battery cell assembly; and a band clip bent from the band body and fixed to the plurality of side plates.

In another aspect of the present disclosure, there is also provided a vehicle including at least one battery pack according to the above embodiments.

Advantageous Effects

According to the above various embodiments, a battery pack capable of increasing energy density and a vehicle including the battery pack may be provided.

Also, according to the above various embodiments, a battery pack capable of reducing the total weight through weight reduction and a vehicle including the battery pack may be provided.

In addition, according to the above various embodiments, a battery pack capable of more efficiently controlling cell swelling and a vehicle including the battery pack may be provided.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
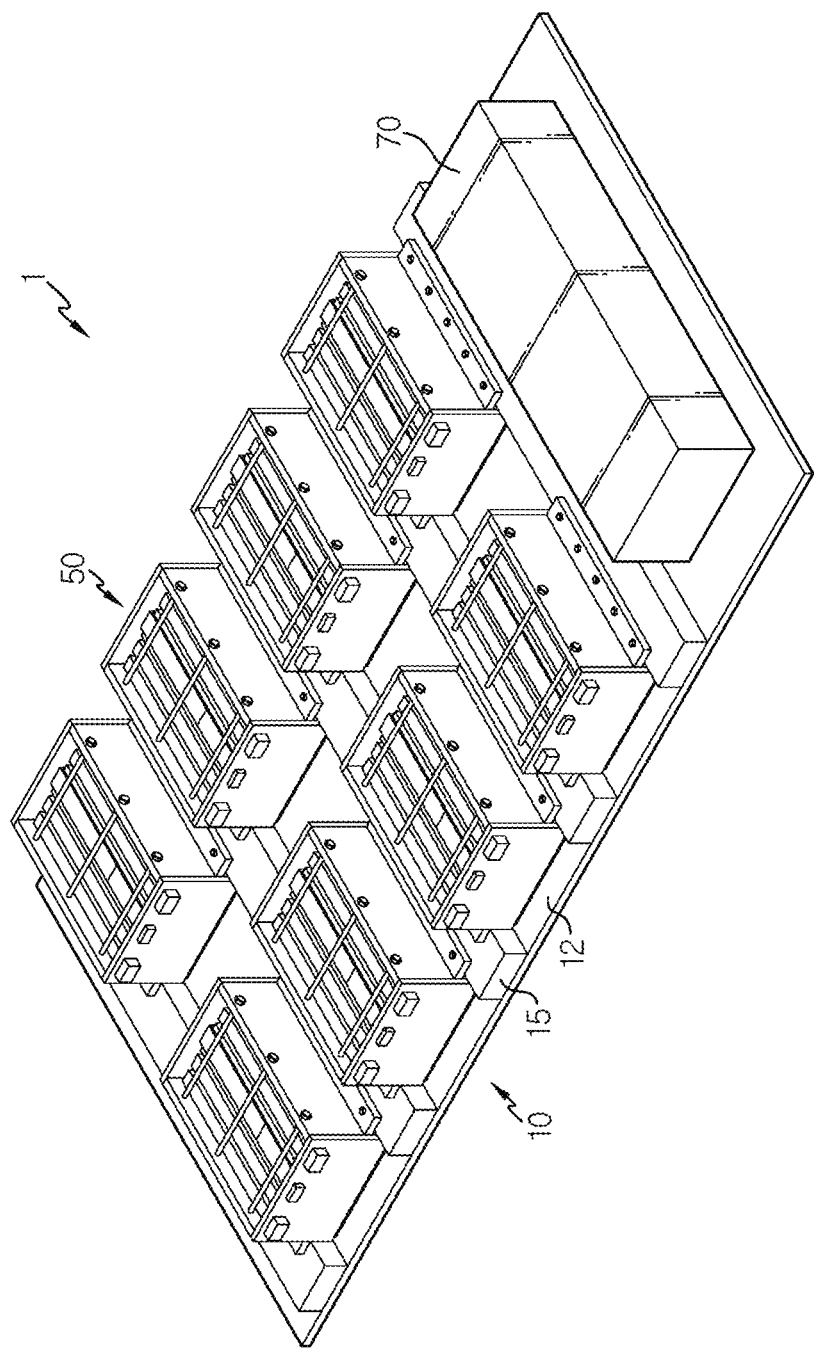
FIG. 1 is a view for describing a battery pack, according to an embodiment of the present disclosure.

The present disclosure will now be described more fully with reference to the accompanying drawings, in which exemplary embodiments of the present disclosure are shown. These embodiments are provided so that the present disclosure will be thorough and complete, and will fully convey the concept of the present disclosure to one of ordinary skill in the art, and the present disclosure may be embodied in many different forms and should not be construed as being limited to the embodiments set forth herein. It will be appreciated that for the purpose of simplicity and clarity of illustration, elements in the drawings have not necessarily been drawn to scale. For example, dimensions of some of the elements may be exaggerated.

FIG. 1 is a view for describing a battery pack, according to an embodiment of the present disclosure.

Referring to FIG. 1, a battery pack 1 according to the present embodiment may be provided in a vehicle V (see FIG. 10), and may include a pack tray 10 and a battery module 50.

The pack tray 10 may be mounted on the vehicle V, and may support at least one battery module 50 and an electric/electronic unit 70 described below.

The pack tray 10 may include a tray body 12 and a mounting beam 15.

Figure 10:
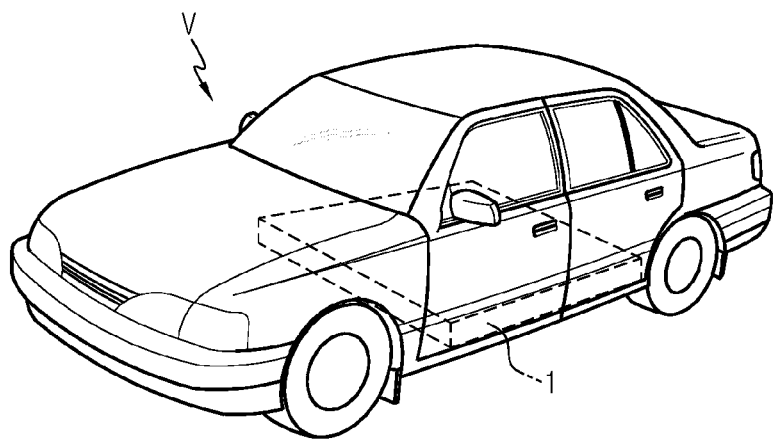
FIG. 10 is a view for describing a vehicle, according to an embodiment of the present disclosure.

The tray body 12 may be mounted on the vehicle V (see FIG. 10). The battery module 50 and the electric/electronic unit 70 may be seated on the tray body 12.

The mounting beam 15 having a certain length may be provided on a top surface of the tray body 12, and may be located between at least a pair of battery modules 50 described below. The mounting beam 15 may buffer impact transmitted from external impact or the like to the battery modules 50.

A plurality of mounting beams 15 may be provided. The plurality of mounting beams 15 may be located between the battery modules 50 described below. This is merely an example, and the mounting beam 15 may be located only between some battery modules 50.

The battery module 50 may be provided on the pack tray 10, and at least one or more battery modules 50 may be provided. The present embodiment will be described assuming that a plurality of battery modules 50 are provided. The plurality of battery modules 50 will be described below in more detail in the following related drawings.

In addition, the battery pack 1 may include the electric/electronic unit 70.

The electric/electronic unit 70 may be mounted on the tray body 12 of the pack tray 10. The electric/electronic unit 70 may include various electric/electronic components for managing or controlling the plurality of battery modules 50.

Hereinafter, the battery module 50 of the battery pack 1 according to the present embodiment will be described in more detail.

Figure 2:
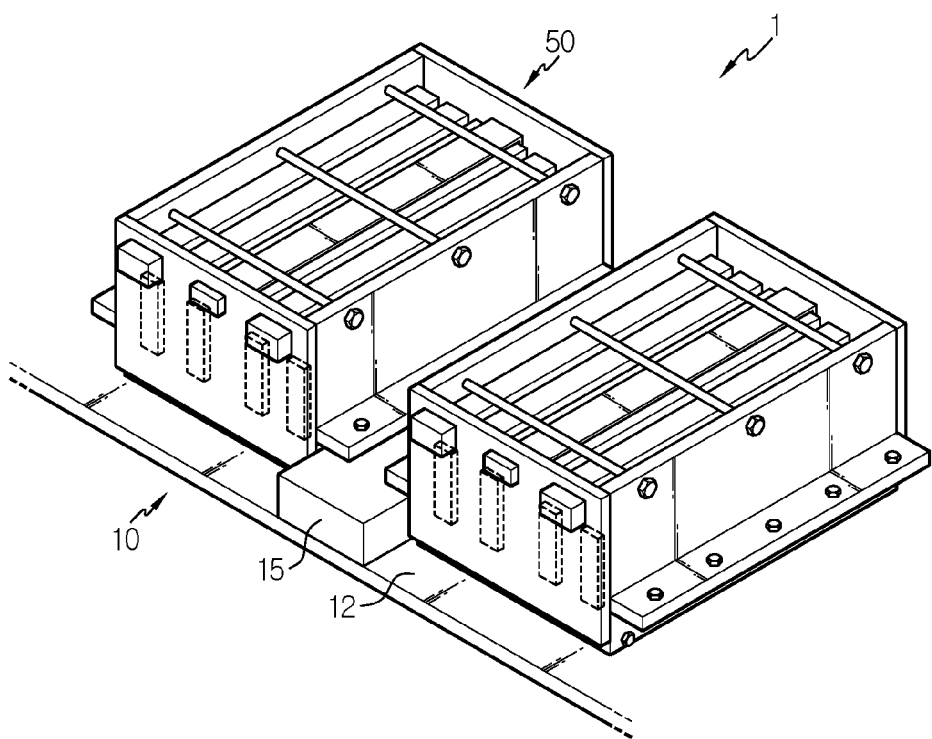
FIG. 2 is a view for describing a main part of the battery pack of FIG. 1.
Figure 3:
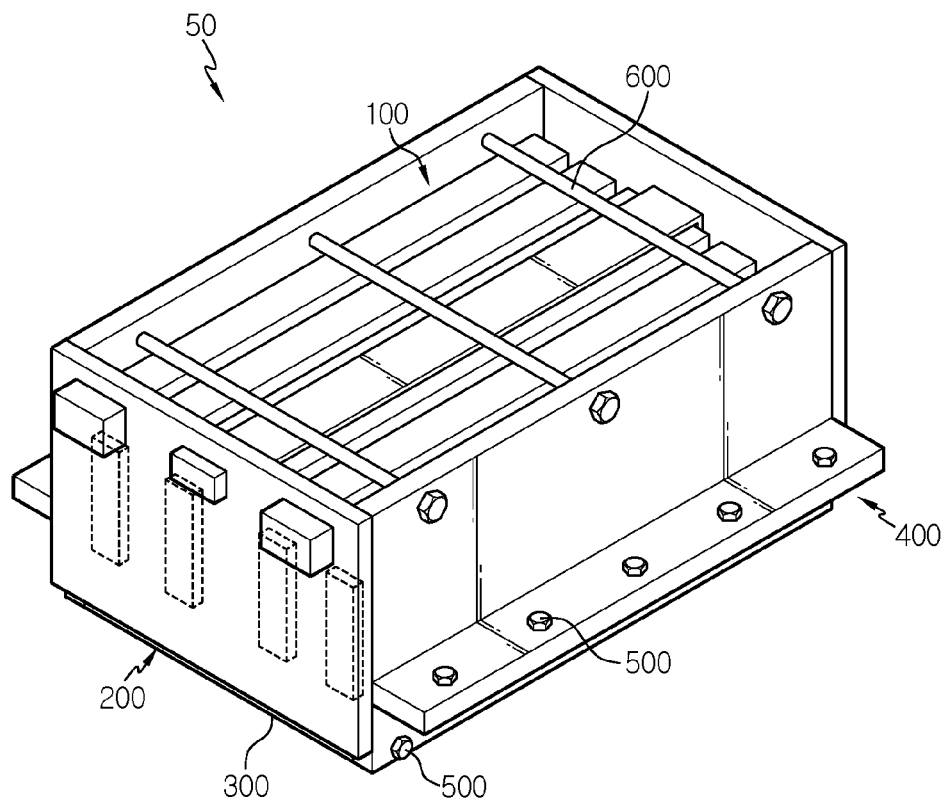
FIG. 3 is a view for describing a battery module of the battery pack of FIG. 2.
Figure 4:
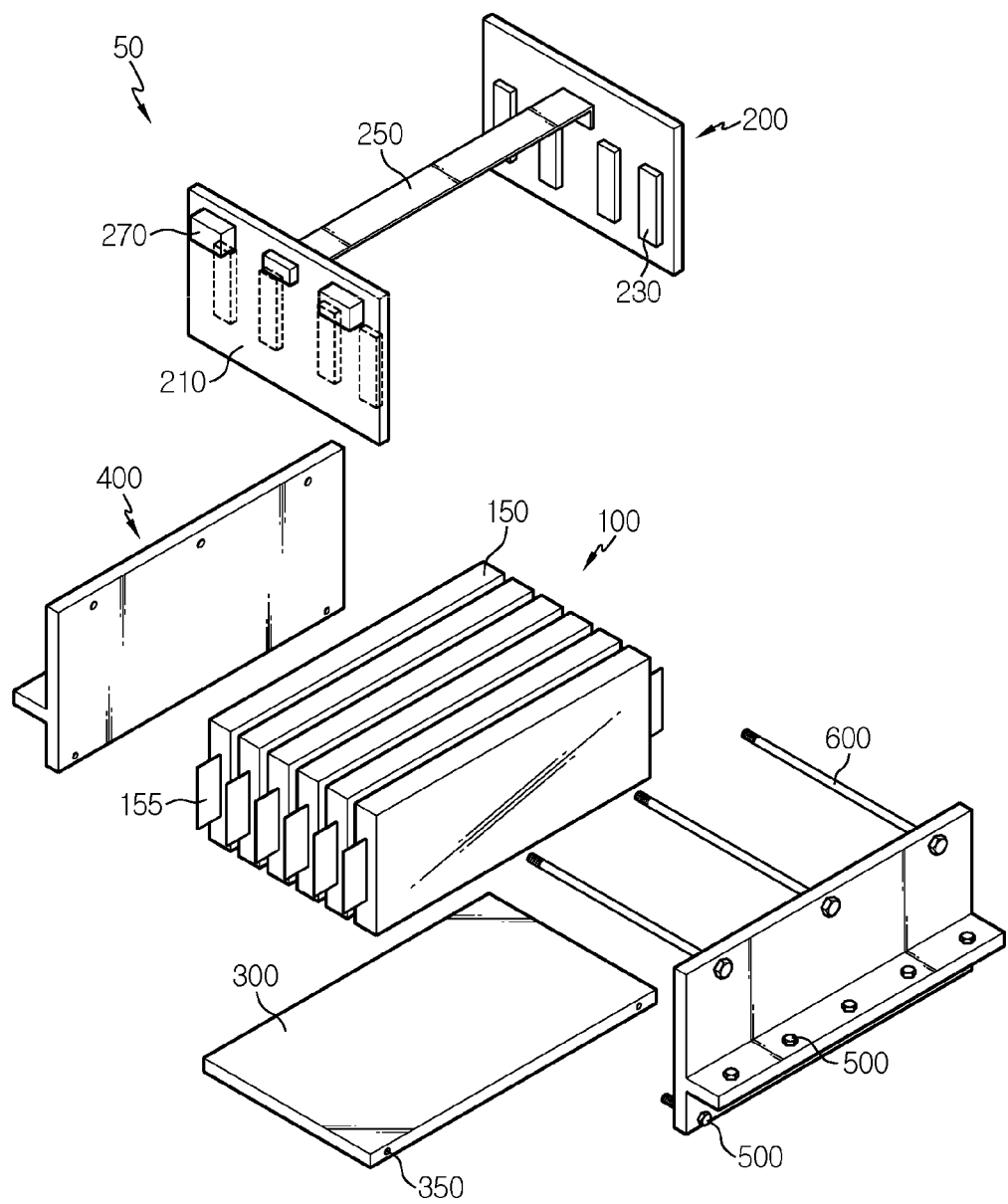
FIG. 4 is an exploded perspective view illustrating the battery module of FIG. 3.

FIG. 2 is a view for describing a main part of the battery pack of FIG. 1. FIG. 3 is a view for describing a battery module of the battery pack of FIG. 2. FIG. 4 is an exploded perspective view illustrating the battery module of FIG. 3.

Referring to FIGS. 2 through 4, each of the plurality of battery modules 50 may include a battery cell assembly 100 and a side plate 400.

The battery cell assembly 100 may be mounted on the pack tray 10. The battery cell assembly 100 may include at least one or more battery cells 150. Hereinafter, the present embodiment will be described assuming that the battery cell assembly 100 includes a plurality of battery cells 150.

The plurality of battery cells 150 may be pouch-type secondary batteries, prismatic secondary batteries, or cylindrical secondary batteries. Hereinafter, the present embodiment will be described assuming that the plurality of battery cells 150 are pouch-type secondary batteries.

Each of the plurality of battery cells 150 may include an electrode assembly, a battery case in which the electrode assembly is accommodated, and a pair of electrode leads 155 protruding from the battery case and electrically connected to the electrode assembly.

The battery module 50 may further include a bus bar assembly 200.

The bus bar assembly 200 may be electrically connected to the battery cell assembly 100, and may cover a front side and a rear side of the battery cell assembly 100.

The bus bar assembly 200 may include a bus bar cover 210, a bus bar member 230, a sensing printed circuit board (PCB) 250, and a connector 270.

The bus bar cover 210 may cover the front side and the rear side of the battery cell assembly 100. To this end, a pair of bus bar covers 210 may be provided, and may cover the front side and the rear side of the battery cell assembly 100.

The bus bar member 230 may be provided on the bus bar cover 210, and may be electrically connected to the electrode leads 155 of the plurality of battery cells 150 of the battery cell assembly 100. A plurality of bus bar members 230 may be provided.

The sensing PCB 250 may connect the pair of bus bar covers 210, and may be provided as a flexible printed circuit board. The sensing PCB 250 may have a certain length, and may be located over the battery cell assembly 100.

The connector 270 may be provided on at least one bus bar cover 210, and may be electrically connected to an external device. A plurality of connectors 270 may be provided. For example, the plurality of connectors 270 may include a high voltage connector and a low voltage connector.

The battery module 50 may further include a heat sink 300.

The heat sink 300 for cooling the battery cell assembly 100 may be located under the battery cell assembly 100. The heat sink 300 may be provided on the tray body 12 of the pack tray 10.

A plurality of fastening holes 350 may be formed in the heat sink 300. Fastening members 500 for coupling the side plate 400 may be inserted into the plurality of fastening holes 350.

The heat sink 300 may be fixed to the side plate 400 by using a coupling method such as welding instead of the fastening members 500.

In the present embodiment, because the heat sink 300 is individually provided for each battery module 50, a cooling path of the battery module 50 may be reduced and the weight of the battery pack 1 may be reduced.

Figure 5:
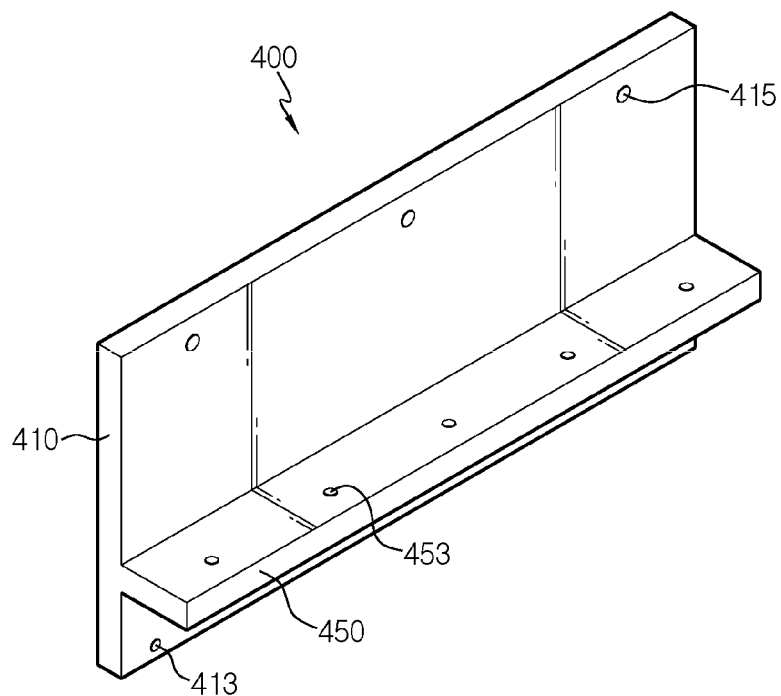
FIG. 5 is a view for describing a side plate of the battery module of FIG. 4.

FIG. 5 is a view for describing a side plate of the battery module of FIG. 4.

Referring to FIG. 5, the side plate 400 may be provided on both side surfaces of the at least one battery cell assembly 100 to support the at least one battery cell assembly 100, and may be fixed to the pack tray 10. A pair of side plates 400 may be provided for each battery module 50.

Each of the pair of side plates 400 may include a support portion 410 and a fixed portion 450.

The support portion 410 may cover a side surface of the at least one battery cell assembly 100, and may support the at least one battery cell assembly 100. The support portion 410 may be located perpendicular to the pack tray 10.

A heat sink fastening hole 413 and a connection hole 415 may be formed in the support portion 410.

The heat sink fastening hole 413 may be formed in a lower portion of the support portion 410, and a plurality of heat sink fastening holes 413 may be provided. The fastening members 500 for fastening with the heat sink 300 may respectively pass through the plurality of heat sink fastening holes 413.

The connection hole 415 may be formed in an upper portion of the support portion 410, and a plurality of connection holes 415 may be provided. Connection members 600 for connecting the pair of side plates 400 may pass through the plurality of connection holes 415.

The fixed portion 450 may extend from the support portion 410, and may be fixed to the pack tray 10. The fixed portion 450 may protrude by a certain length from the support portion 410 to be perpendicular to the support portion 410.

In the present embodiment, due to this protruding structure of the fixed portion 450, when an abnormal situation such as expansion according to cell swelling of the battery cell assembly 100 occurs, a rigid structure of the battery module 50 for controlling the cell swelling may be secured, through the fixed portion 450.

The fixed portion 450 may be fixed to the mounting beam 15 of the pack tray 10. The fixed portion 450 may be formed so that a height of the fixed portion 450 is greater than a height of the mounting beam 15, in a height direction of the pack tray 10.

A beam fastening hole 453 may be formed in the fixed portion 450.

A plurality of beam fastening holes 453 may be provided. The fastening members 500 for fastening with the mounting beam 15 of the pack tray 10 may respectively pass through the plurality of beam fastening holes 453.

In the present embodiment, the battery module 50 may be directly fastened to the mounting beam 15 of the pack tray 10 through a pair of side plates 400 provided for each of the plurality of battery modules 50, and the pair of side plates 400 of the battery module 50 may be connected to each other through the connection members 600.

Accordingly, in the present embodiment, the battery modules 50 may be stably mounted on the pack tray 10 even without an additional case structure for fixing with the pack tray 10, and the battery cell assembly 100 may be stably supported and fixed even without an additional member such as a cover case of the battery module.

As a result, because an additional case and an additional cover case used in the prior art may be omitted, in the present embodiment, energy density of the battery pack 1 may be significantly improved, and the battery pack 1 may have a slimmer structure.

Figure 6:
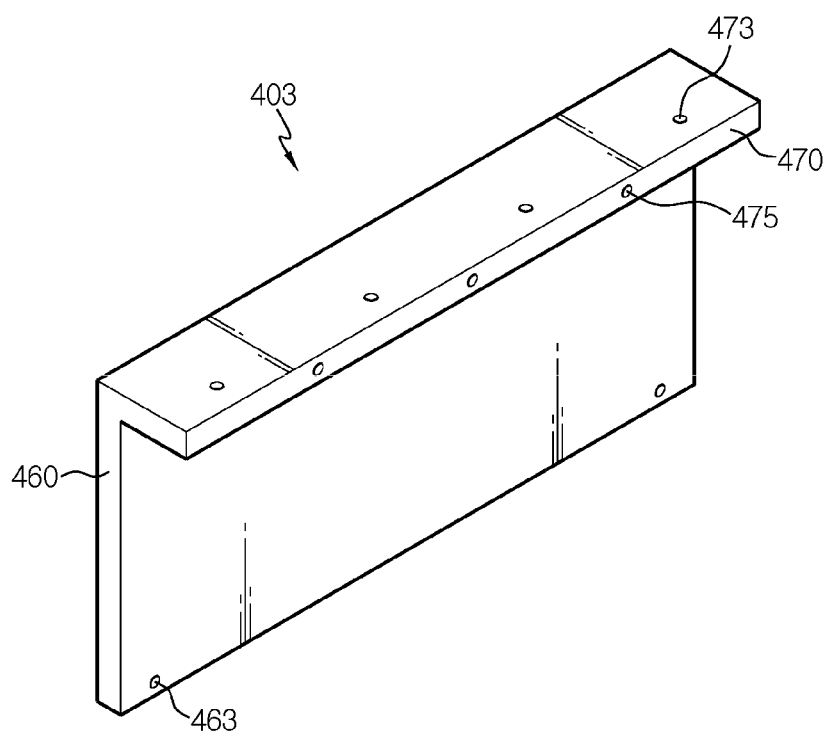
FIG. 6 is a view for describing another embodiment of the side plate of FIG. 5.

FIG. 6 is a view for describing another embodiment of the side plate of FIG. 5.

Referring to FIG. 6, a side plate 403 may include a support portion 460 and a fixed portion 470.

At least one heat sink fastening hole 463 through which the fastening member 500 (see FIGS. 3 and 4) for fastening with the heat sink 300 (see FIGS. 2 and 3) passes may be formed in the support portion 460.

The fixed portion 470 may protrude from an upper end of the support portion 460 to be perpendicular to the support portion 460. The fixed portion 470 may be provided on the upper end of the support portion 460 to secure rigidity.

A plurality of beam fastening holes 473 through which the fastening members 500 for fastening with the mounting beam 15 (see FIGS. 2 and 3) of the pack tray 10 (see FIGS. 2 and 3) passes may be formed in the fixed portion 470.

A plurality of connection holes 475 through which the connection members 600 for connecting the pair of side plates 403 pass may be formed in the fixed portion 470.

Figure 7:
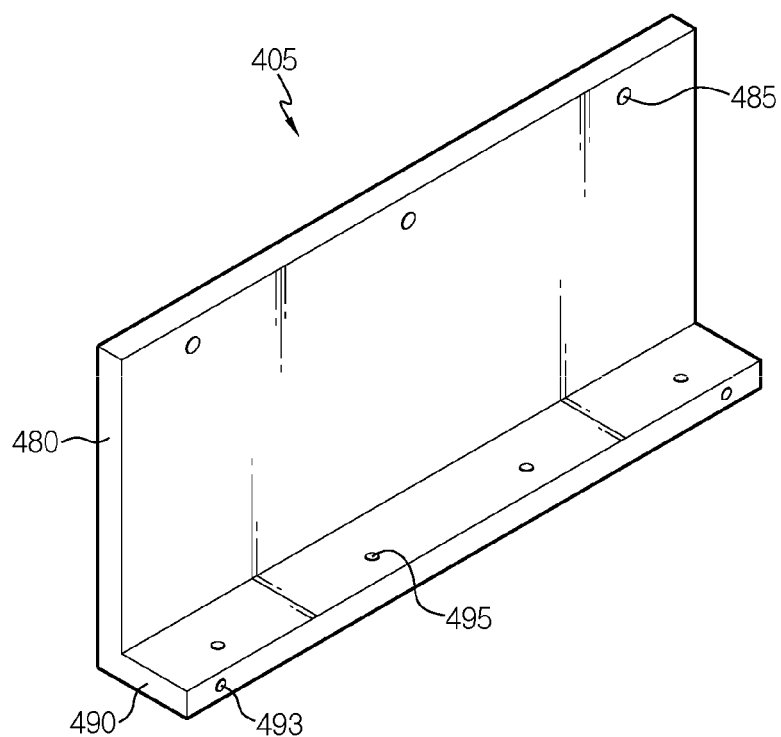
FIG. 7 is a view for describing another embodiment of the side plate of FIG. 5.

FIG. 7 is a view for describing another embodiment of the side plate of FIG. 5.

Referring to FIG. 7, a side plate 405 may include a support portion 480 and a fixed portion 490.

A plurality of connection holes 485 through which the connection members 600 (see FIGS. 2 and 3) for connecting the pair of side plates 405 pass may be formed in the support portion 480.

The fixed portion 490 may protrude from a lower end of the support portion 480 to be perpendicular to the support portion 480. The fixed portion 490 may be provided on the lower end of the support portion 480 to secure rigidity.

At least one heat sink fastening hole 493 through which the fastening member 500 (see FIGS. 3 and 4) for fastening with the heat sink 300 (see FIGS. 2 and 3) passes may be formed in the fixed portion 490.

A plurality of beam fastening holes 495 through which the fastening members 500 for fastening with the mounting beam 15 (see FIGS. 2 and 3) of the pack tray 10 (see FIGS. 2 and 3) pass may be formed in the fixed portion 490.

As such, various protruding structures for securing the rigidity of the fixed portions 450, 470, 490 of the side plates 400, 403, 405 may be provided.

Referring back to FIGS. 2 through 5, the battery module 50 may further include the fastening member 500.

The fastening member 500 may be for fixing the fixed portions 410 of the pair of side plates 400 to the mounting beam 15 of the pack tray 10, and a plurality of fastening members 500 may be provided.

The plurality of fastening members 500 may be bolt members. In addition, the plurality of fastening members 500 may be used to fasten the pair of side plates 400 to the heat sink 300.

In detail, the plurality of fastening members 500 may pass through the fixed portions 410 of the pair of side plates 400 to be fastened to the mounting beam 15 of the pack tray 10.

The battery module 50 may further include the connection member 600.

The connection member 600 may be connected to the side plates 400 provided on both sides of the at least one battery cell assembly 100, and may be located over the at least one battery cell assembly 100.

The connection member 600 may include at least one long bolt member 600 fastened to the side plates 400 provided on both sides of the at least one battery cell assembly 100.

At least one or more long bolt members 600 may be provided. Hereinafter, the present disclosure will be described assuming that a plurality of long bolt members 600 are provided.

Each of the plurality of long bolt members 600 may pass through the pair of side plates 400 to connect the pair of side plates 400. The plurality of long bolt members 600 may be located over the battery cell assembly 100.

As such, the battery pack 1 according to the present embodiment may improve energy density through the above structure and may reduce the total weight through weight reduction.

In addition, the battery pack 1 according to the present embodiment may more efficiently control cell swelling, through the protruding structure of the pair of side plates 400, 403, 405.

Figure 8:
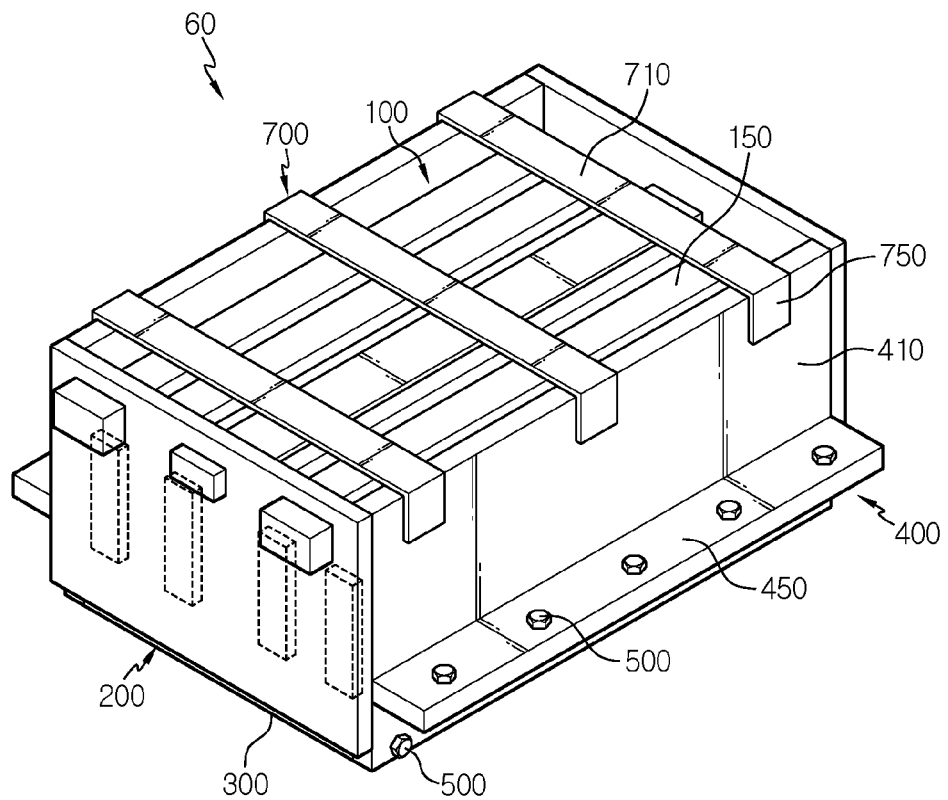
FIG. 8 is a view for describing a battery module, according to another embodiment of the present disclosure.

FIG. 8 is a view for describing a battery module, according to another embodiment of the present disclosure.

A battery module 60 according to the present embodiment is similar to the battery module 50 of the above embodiment, and thus a repeated description of elements that are substantially the same as or similar to those in the above embodiment will be omitted and a difference from the above embodiment will be mainly described.

Referring to FIG. 8, the battery module 60 may include the battery cell assembly 100, the bus bar assembly 200, the heat sink 300, the pair of side plates 400, the fastening member 500, and a connection member 700.

The battery cell assembly 100, the bus bar assembly 200, the heat sink 300, the pair of side plates 400, and the fastening member 500 are similar to those in the above embodiment, and thus a repeated description thereof will be omitted.

The connection member 700 may include at least one band member 700 that integrally covers the side plates 400 provided on both sides of the at least one battery cell assembly 100.

The band member 700 may be a metal member formed of an elastic material, and at least one or more band members 700 may be provided. Hereinafter, the present embodiment will be described assuming that a plurality of band members 700 are provided.

Each of the plurality of band members 700 may include a band body 710 and a band clip 750.

The band body 710 may be formed of an elastic material having a certain length, and may be located over the at least one battery cell assembly 100.

The band clip 750 may be integrally formed with the band body 710, and may be bent downward from both ends of the band body 710 and may be fixed to the side plates 400.

The band clip 750 may be additionally fixed to each of the side plates 400 by using welding or the like. Accordingly, the band member 700 may be more stably fixed to the side plates 400.

As such, the connection member 700 may be provide as the band member 700 having elasticity and using a welding method, instead of the long bolt member 600 using a bolting method as in the above method.

Figure 9:
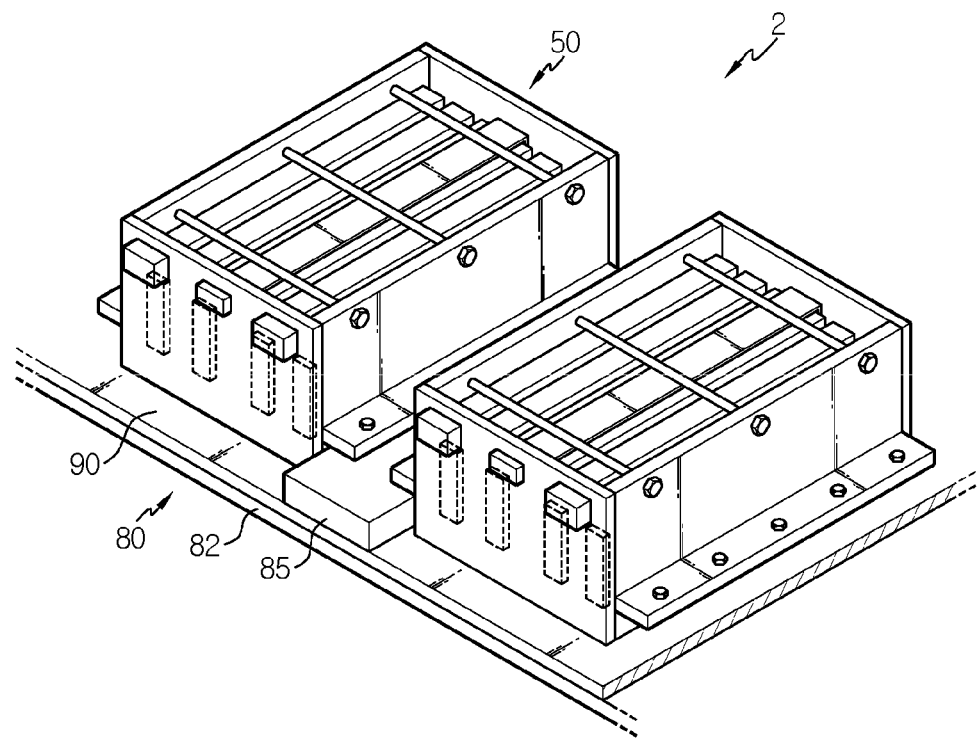
FIG. 9 is a view for describing a battery pack, according to another embodiment of the present disclosure.

FIG. 9 is a view for describing a battery pack, according to another embodiment of the present disclosure.

A battery pack 2 according to the present embodiment is similar to the battery pack 1 of the above embodiment, and thus a repeated description of elements that are substantially the same as or similar to those in the above embodiment will be omitted and a difference from the above embodiment will be mainly described.

Referring to FIG. 9, the battery pack 2 may include the plurality of battery modules 50, a pack tray 80, and an integrated heat sink 90.

The plurality of battery modules 50 are substantially the same or similar to those in the above embodiment, and thus a repeated description thereof will be omitted. The plurality of battery modules 60 of the above embodiment, instead of the plurality of battery modules 50, may be provided, or a combination of the battery modules 50 and the battery modules 60 may be provided.

The pack tray 80 may include a tray body 82 and a mounting beam 85.

The tray body 82 and the mounting beam 85 are similar to the tray body 12 and the mounting beam 15 of the above embodiment, and thus a repeated description thereof will be omitted.

The integrated heat sink 90 may be provided on the tray body 82 of the pack tray 80, and may have a shape and a size large enough to cover all of the plurality of battery modules 50.

The integrated heat sink 90 may integrally cover bottom surfaces of the plurality of battery modules 50 and may be provided on the tray body 82 of the pack tray 80.

As such, the battery pack 2 according to the present embodiment may integrally control cooling of the plurality of battery modules 50 through the integrated heat sink 90, and may more stably support the plurality of battery modules 50.

FIG. 10 is a view for describing a vehicle, according to an embodiment of the present disclosure.

Referring to FIG. 10, the vehicle V according to the present embodiment may include at least one battery pack 1 of the above embodiment. This is merely an example, and the vehicle V may include at least one battery pack 2 (see FIG. 9), or may include a combination of the battery pack 1 and the battery pack 2 (see FIG. 9).

The battery pack 1 in the vehicle V may be provided as a fuel source of the vehicle V. For example, the battery pack 1 may be provided in an electric vehicle, a hybrid vehicle, and other types of vehicles V using the battery pack 1 as a fuel source.

Also, the battery pack 1 may be provided in other devices, equipment, and facilities such as energy storage systems using secondary batteries, as well as the vehicle V.

According to the above various embodiments, the battery pack 1 capable of increasing energy density and the vehicle V including the battery pack 1 may be provided.

Also, according to the above various embodiments, any of the battery packs 1 and 2 capable of reducing the total weight through weigh reduction and the vehicle V including the battery pack may be provided.

In addition, according to the above various embodiments, any of the battery packs 1 and 2 capable of more efficiently controlling cell swelling and the vehicle V including the battery pack may be provided.

While the preferred embodiments of the present disclosure have been shown and described, the present disclosure is not limited to the specific embodiments described above, various modifications may be made by one of ordinary skill in the art to which the present disclosure pertains without departing from the gist of the present disclosure as defined by the claims, and these modifications should not be individually understood from the technical feature or prospect of the present disclosure.

What is claimed is:

1. A battery pack provided in a vehicle, the battery pack comprising:
   a pack tray mounted on the vehicle;
   a mounting beam having a certain length provided on a top surface of the pack tray,
   at least one battery module provided on the pack tray,
   wherein the at least one battery module comprises:
   at least one battery cell assembly mounted on the pack tray, and comprising at least one battery cell; and
   a plurality of side plates provided on opposite side surfaces of the at least one battery cell assembly to support the at least one battery cell assembly, the plurality of side plates being fixed to the pack tray,
   wherein each of the plurality of side plates comprises:
   a support portion supporting the at least one battery cell assembly; and
   a fixed portion extending from the support portion, and fixed to the pack tray,
   wherein the fixed portion is fixed to the mounting beam, and
   wherein a longest portion of each of the mounting beam, the fixed portion and the support portion extends parallel to a longitudinal direction of the at least one battery cell.

2. The battery pack of claim 1, wherein the support portion covers a side surface of the at least one battery cell assembly, and extending in a perpendicular direction to the pack tray, and
   wherein the fixed portion protrudes by a certain length from the support portion and perpendicular to the support portion.

3. The battery pack of claim 1, wherein the fixed portion is formed so that a height of the fixed portion is greater than a height of the mounting beam, in a height direction of the pack tray.

4. The battery pack of claim 3, wherein the at least one battery module further comprises at least one fastening member configured to fix the fixed portion to the mounting beam, and
   wherein the at least one fastening member passes through the fixed portion to be fastened to the mounting beam.

5. The battery pack of claim 1, wherein the at least one battery module further comprises at least one connection member connected to the plurality of side plates provided on opposite sides of the at least one battery cell assembly, and located over the at least one battery cell assembly.

6. The battery pack of claim 5, wherein the at least one connection member comprises at least one bolt member fastened to the plurality of side plates provided on opposite sides of the at least one battery cell assembly.

7. The battery pack of claim 5, wherein the at least one connection member comprises at least one band member integrally covering the plurality of side plates provided on opposite sides of the at least one battery cell assembly.

8. The battery pack of claim 7, wherein the at least one band member comprises:
   a band body located over the at least one battery cell assembly; and
   a band clip bent from the band body and fixed to the plurality of side plates.

9. A vehicle comprising at least one battery pack according to claim 1.

10. The battery pack of claim 1, wherein the at least one battery cell includes a pair of leads protruding from the at least one battery cell in the longitudinal direction of the at least one battery cell, and
    wherein the plurality of side plates extend in the longitudinal direction of the at least one battery cell.

11. The battery pack of claim 1, wherein the plurality of side plates compresses the opposite side surfaces of the at least one battery cell assembly, respectively.

12. The battery pack of claim 1, further comprising a plurality of bus bar covers provided on front and rear sides, respectively, of the at least one battery cell assembly,
    wherein each bus bar cover includes a bus bar member electrically connected to leads of the at least one battery cell.

13. The battery pack of claim 1, further comprising a heat sink interposed between the at least one battery cell assembly and the pack tray,
    wherein the support portion is coupled to the heat sink via a fastening member.

* * * * *